(12) United States Patent
Wu

(10) Patent No.: US 10,231,107 B2
(45) Date of Patent: Mar. 12, 2019

(54) RESOURCE SUBSCRIPTION PROCESSING METHOD AND DEVICE

(71) Applicant: ZTE CORPORATION, Shenzhen, Guangdong Province (CN)

(72) Inventor: Hao Wu, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 268 days.

(21) Appl. No.: 15/317,977

(22) PCT Filed: Aug. 13, 2014

(86) PCT No.: PCT/CN2014/084319
§ 371 (c)(1),
(2) Date: Dec. 12, 2016

(87) PCT Pub. No.: WO2015/188440
PCT Pub. Date: Dec. 17, 2015

(65) Prior Publication Data
US 2017/0134523 A1 May 11, 2017

(30) Foreign Application Priority Data
Jun. 13, 2014 (CN) .......................... 2014 1 0265351

(51) Int. Cl.
H04W 4/70 (2018.01)
H04W 4/50 (2018.01)
H04L 29/08 (2006.01)

(52) U.S. Cl.
CPC ............... *H04W 4/70* (2018.02); *H04L 67/12* (2013.01); *H04L 67/327* (2013.01); *H04W 4/50* (2018.02)

(58) Field of Classification Search
CPC .......... H04W 4/50; H04W 4/70; H04L 67/12; H04L 67/32
(Continued)

(56) References Cited

U.S. PATENT DOCUMENTS
2013/0311598 A1 11/2013 Arrouye et al.

FOREIGN PATENT DOCUMENTS
CN 101895578 A 11/2010
CN 103795689 A 5/2014
(Continued)

OTHER PUBLICATIONS

KP84005049; oneM2M Technical Specifictation; oneM2M Functional Architecture Interim Draft; onM2M-TS-0001-V-0.4.1; Feb. 26, 2014; all pages.*
(Continued)

*Primary Examiner* — Glenford J Madamba
(74) *Attorney, Agent, or Firm* — Ling Wu; Stephen Yang; Ling and Yang Intellectual Property

(57) ABSTRACT

Provided are a resource subscription processing method and device. The method includes: a Common Server Entity (CSE) receiving a resource subscription request sent by a subscriber, the resource subscription request carrying content of a notification and/or an object to which the notification is to be sent, the notification is for indicating an operation to a subscribed resource; and the CSE sending a notification message to the subscriber and/or the object to which the notification is to be sent according to the content of the notification.

8 Claims, 6 Drawing Sheets

(58) Field of Classification Search
USPC .......................................................... 709/202
See application file for complete search history.

(56) References Cited

FOREIGN PATENT DOCUMENTS

| EP | 2930879 A1 * | 10/2015 | ............. H04W 4/70 |
| EP | 2930879 A1 | 10/2015 | |
| WO | 2014088340 A1 | 6/2014 | |

OTHER PUBLICATIONS

XP084005049; oneM2M Technical Specification; oneM2M Functional Architecture Intrim Draft; oneM2M-TS-0001-V-0.4.1, Feb. 26, 2014.

* cited by examiner

RESOURCE SUBSCRIPTION PROCESSING METHOD AND DEVICE

TECHNICAL FIELD

The present document relates to the field of communication, in particular to a resource subscription processing method and device.

BACKGROUND OF THE RELATED ART

A Machine to Machine (M2M) communication network consists of M2M nodes and a bearer network. The M2M nodes realize mutual communication through the bearer network. A M2M node at least includes an Application Entity (AE) or a Common Server Entity (CSE).

The application entity is a logic unit for executing an actual M2M application and the common sever entity is a logic unit for managing and serving the application. In M2M system architecture, an application node is an execution node at a terminal end, such as an intelligent electricity meter, a temperature measurement and control sensor, a fire alarm or an intelligent domestic electrical appliance, etc., an intermediate node is a middleware which connects the execution node at the terminal end to a network-side server, such as a gateway, a basic node is the network-side server, and an application entity which is registered to the basic node is usually management software or a management platform of an M2M service provider.

FIG. 1 illustrates an architectural schematic diagram of an M2M communication network in the related art. As illustrated in FIG. 1, communication between M2M applications is implemented through interaction between CSEs, the communication is based on a premise that the M2M applications firstly need to be registered to local CSEs (e.g., an application entity on an application node in FIG. 1 needs to be registered to a CSE on an intermediate node, and the CSE on the intermediate node is a local CSE of the application entity on the application node), and then interaction between the M2M applications can be implemented through communication between CSEs.

An application node is a physical entity, and an Application Entity (AE) is a logic unit and is a logic unit which actually executes an application on the physical entity, i.e., the application node. When the application entity is registered to the local CSE, the application entity needs to provide a security certificate which can identify validity of the application entity and provide the security certificate to the local CSE for verification. The application entity cannot be registered to the local CSE until the verification passes. At the same time, the application entity further needs to provide a registration name recommended by the application entity to the local CSE for reference.

The registered application entity (AE) may also create a resource related to the application on the local CSE, and the resource is used as a sub-resource of an application resource. For example, after the AE is registered, a resource "application" is created on the local CSE, the application may also create a resource "container" under the resource "application" in order to save the data of the application, and the resource "container" is used for saving data related to the AE. The AE may acquire a message indicating whether a certain resource is changed by means of subscription. When an attribute or a sub-resource of the subscribed resource is changed, e.g., a value of the attribute is modified, the sub-resource is deleted or a sub-resource is newly created, the CSE at which the resource is located may send a notification message to the AE to send the modified attribute or sub-resource content or link to the AE.

The subscription of a resource is implemented by the AE by creating a sub-resource of a type "subscription" under a resource which is wanted to be subscribed by the CSE, and the AE is called as a subscriber. However, after the AE subscribes the resource, the resource may be modified or updated. In the related art, the AE does not know about the modification or update of the subscribed resource.

Therefore, there is a problem that resources cannot be effectively protected and used because the subscribed resource cannot be effectively monitored by an AE in the related art.

SUMMARY

The present document provides a resource subscription processing method and device, so as to at least solve the problem that resources cannot be effectively protected and used because a subscribed resource cannot be effectively monitored by an AE in the related art.

According to an aspect of the present document, a resource subscription processing method is provided, including: a Common Server Entity (CSE) receiving a resource subscription request sent by a subscriber, herein the resource subscription request carries content of a notification and/or an object to which the notification is to be sent, the notification is for indicating an operation to a subscribed resource; and the CSE sending a notification message to the subscriber and/or the object to which the notification is to be sent according to the content of the notification.

In an exemplary embodiment, before the CSE sends the notification message to the subscriber and/or the object to which the notification is to be sent according to the content of the notification, the method further includes: under a situation that the resource subscription request carries indication information for indicating that the notification message is sent only when a predetermined operation is performed to the subscribed resource, judging whether the operation performed to the subscribed resource is the predetermined operation; and under a situation that a judgment result is yes, generating the notification message according to the content of the notification.

In an exemplary embodiment, the content of the notification includes at least one of the following: an identifier of an operator which performs the operation to the subscribed resource, and a type of the operation performed to the subscribed resource.

In an exemplary embodiment, the CSE sending the notification message to the subscriber and/or the object to which the notification is to be sent according to the content of the notification includes at least one of the following: under a situation that the content of the notification is the identifier of the operator which performs the operation to the subscribed resource, the CSE sending the notification message carrying an identifier of an operation request sender to the subscriber and/or the object to which the notification is to be sent; under a situation that the content of the notification is the identifier of the operator which performs the operation to the subscribed resource and the type of the operation performed to the subscribed resource, the CSE sending the notification message carrying the identifier of the operation request sender and the type of the operation performed to the subscribed resource to the subscriber and/or the object to which the notification is to be sent; under a situation that the content of the notification is the type of the operation performed to the subscribed resource, the CSE sending the notification message carrying the type of the operation performed to the subscribed resource to the subscriber and/or the object to which the notification is to be sent; regardless of what the content of the notification indicated by the resource subscription request is, the CSE sending the notification message carrying the identifier of the operation request sender to the subscriber and/or the object to which the notification is to be sent; regardless of what the content of the notification indicated by the resource subscription request is, the CSE sending the notification message carrying the identifier of the operation request sender and the type of the operation performed to the subscribed resource to the subscriber and/or the object to which the notification is to be sent; and regardless of what of the content of the notification indicated by the resource subscription request is, the CSE sending the notification message carrying the type of the operation performed to the subscribed resource to the subscriber and/or the object to which the notification is to be sent.

According to another aspect of the present document, a resource subscription processing method is provided, including: an Application Entity (AE) sending a resource subscription request to a Common Sever Entity (CSE), herein the resource subscription request carries content of a notification, the notification is for indicating an operation to a subscribed resource; and the AE receiving a notification message fed back by the CSE according to the content of the notification.

In an exemplary embodiment, the content of the notification includes at least one of the following: an identifier of an operator which performs the operation to the subscribed resource, and a type of the operation performed to the subscribed resource.

In an exemplary embodiment, the AE receiving the notification message fed back by the CSE according to the content of the notification includes at least one of the following: the AE receiving the notification message fed back by the CSE which carries an identifier of an operation request sender; the AE receiving the notification message fed back by the CSE which carries the identifier of the operation request sender and the type of the operation performed to the subscribed resource; and the AE receiving the notification message fed back by the CSE which carries the type of the operation performed to the subscribed resource.

In an exemplary embodiment, after the AE receives the notification message fed back by the CSE according to the content of the notification, the method further includes: updating an operation record of operations to the subscribed resource according to the notification message.

According to another aspect of the present document, a resource subscription processing device configured as a Common Server Entity (CSE) is provided, including: a first receiving module, arranged to receive a resource subscription request sent by a subscriber, herein the resource subscription request carries content of a notification and/or an object to which the notification is to be sent, the notification is for indicating an operation to a subscribed resource; and a first sending module, arranged to send a notification message to the subscriber and/or the object to which the notification is to be sent according to the content of the notification.

In an exemplary embodiment, the device further includes: a judgment module arranged to, under a situation that the resource subscription request carries indication information for indicating that the notification message is sent only when a predetermined operation is performed to the subscribed resource, judge whether the operation performed to the subscribed resource is the predetermined operation; and a generation module arranged to, under a situation that a judgment result is yes, generate the notification message according to the content of the notification.

In an exemplary embodiment, the first sending module includes at least one of the following: a first sending unit, arranged to, under a situation that the content of the notification is an identifier of an operator which performs the operation to the subscribed resource, send the notification message carrying an identifier of an operation request sender to the subscriber and/or the object to which the notification is to be sent; a second sending unit, arranged to, under a situation that the content of the notification is the identifier of the operator which performs the operation to the subscribed resource and a type of the operation performed to the subscribed resource, send the notification message carrying the identifier of the operation request sender and the type of the operation performed to the subscribed resource to the subscriber and/or the object to which the notification is to be sent; a third sensing unit, arranged to, under a situation that the content of the notification is the type of the operation performed to the subscribed resource, send the notification message carrying the type of the operation performed to the subscribed resource to the subscriber and/or the object to which the notification is to be sent; a fourth sending unit, arranged to, regardless of what the content of the notification indicated by the resource subscription request is, send the notification message carrying the identifier of the operation request sender to the subscriber and/or the object to which the notification is to be sent; a fifth sending unit, arranged to, regardless of what the content of the notification indicated by the resource subscription request is, send the notification message carrying the identifier of the operation request sender and the type of the operation performed to the subscribed resource to the subscriber and/or the object to which the notification is to be sent; and a sixth sending unit, arranged to, regardless of what the content of the notification indicated by the resource subscription request is, send the notification message carrying the type of the operation performed to the subscribed resource to the subscriber and/or the object to which the notification is to be sent.

According to another aspect of the present document, a resource subscription processing device configured as an Application Entity (AE) is provided, including: a second sending module, arranged to send a resource subscription request to a Common Sever Entity (CSE), herein the resource subscription request carries content of a notification, the notification is for indicating an operation to a subscribed resource; and a second receiving module, arranged to receive a notification message fed back by the CSE according to the content of the notification.

In an exemplary embodiment, the second receiving module includes at least one of the following: a first receiving unit, arranged to receive the notification message fed back by the CSE which carries an identifier of an operation request sender; a second receiving unit, arranged to receive the notification message fed back by the CSE which carries the identifier of the operation request sender and a type of the operation performed to the subscribed resource; and a third receiving unit, arranged to receive the notification message fed back by the CSE which carries the type of the operation performed to the subscribed resource.

In an exemplary embodiment, the device further includes: an updating module arranged to update an operation record of operations to the subscribed resource according to the notification message.

With the present document, by adopting a scheme in which a Common Server Entity (CSE) receives a resource subscription request sent by a subscriber, the resource subscription request carrying content of a notification and/or an object to which the notification is to be sent, the notification is for indicating an operation to a subscribed resource; and the CSE sends a notification message to the subscriber and/or the object to which the notification is to be sent according to the notification content, the problem that resources cannot be effectively protected and used because the subscribed resource cannot be effectively monitored by the AE in the related art is solved, thereby achieving an effect that the AE can effectively monitor the operation performed to the subscribed resource, and not only can the subscribed resource be effectively prevented from being destroyed, but also can the subscribed resource be more efficient.

BRIEF DESCRIPTION OF DRAWINGS

The drawings described hereinafter are used for providing further understanding about the present document and constitute a part of the present application. The exemplary embodiments of the present document and the description thereof are used for explaining the present document instead of improperly limiting the present document. In the drawings.

DETAILED DESCRIPTION

The present document will be described below in detail with reference to the drawings in combination with embodiments. It should be stated that the embodiments in the present application and the features in the embodiments may be mutually combined if there is no conflict.

Figures 1, 2, 3:
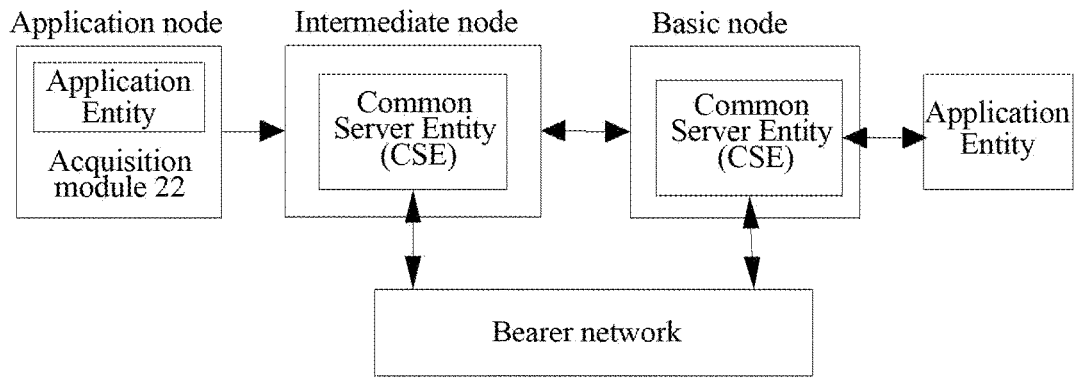
FIG. 1 illustrates an architectural schematic diagram of an M2M communication network in the related art.
FIG. 2 illustrates a flowchart of a first resource subscription processing method according to an embodiment of the present document.
FIG. 3 illustrates a flowchart of a second resource subscription processing method according to an embodiment of the present document.

In an embodiment, a resource subscription processing method is provided. FIG. 2 illustrates a flowchart of a resource subscription processing method 1 according to an embodiment of the present document. As illustrated in FIG. 2, the process includes the following steps:

In step S202, a Common Server Entity (CSE) receives a resource subscription request sent by a subscriber. The resource subscription request carries content of a notification and/or an object to which the notification is to be sent, and the notification is for indicating an operation to a subscribed resource. It should be stated that the content of the notification may include various contents, e.g., may include at least one of the following: an identifier of an operator which performs the operation to the subscribed resource, and a type of the operation performed to the subscribed resource.

In step S204, the CSE sends a notification message to the subscriber and/or the object to which the notification is to be sent according to the content of the notification.

Through the above-mentioned steps, for the CSE, the CSE receives resource subscription request sent by the AE which carries content of a notification about the operation performed to the subscribed resource, and sends the notification message to the AE according to the content of the notification. As compared to the related art in which the AE does not know the operation performed to the subscribed resource, by adopting the above-mentioned method, the AE can effectively monitor the operation performed to the subscribed resource, and not only can the subscribed resource be effectively prevented from being destroyed, but also can the subscribed resource be more efficient.

In order to improve the efficiency of notification, before the CSE sends the notification message to the subscriber and/or the object to which the notification is to be sent according to the content of the notification, the following processing may be performed: under a situation that the resource subscription request carries indication information configured for indicating that the notification message is sent only when a predetermined operation is performed to the subscribed resource, whether the operation performed to the subscribed resource is the predetermined operation is judged; and under a situation that a judgment result is yes, the notification message is generated according to the content of the notification. For example, the above-mentioned predetermined operation may be some operations which are more important to the subscribed resource, such as modification, deletion and destruction performed to the subscribed resource. Only when the subscribed resource is subjected to the above-mentioned operations, the AE is notified. In case of operations (such as reading operation and duplication operation) which do not impact the subscribed resource, the AE is not notified. By adopting this processing, not only can the efficiency of notification be effectively improved, but also the waste of the resource can be effectively avoided to a certain extent.

When the CSE sends the notification message to the AE according to the content of the notification, the CSE may send different notification messages to the subscriber and/or the object to which the notification is to be sent according to different contents of notification. For example, at least one of the following is performed: Under a situation that the content of the notification is the identifier of the operator which performs the operation to the subscribed resource, the CSE sends the notification message carrying an identifier of an operation request sender to the subscriber and/or the object to which the notification is to be sent. Under a situation that the content of the notification is the identifier of the operator which performs the operation to the subscribed resource and the type of the operation performed to the subscribed resource, the CSE sends the notification message carrying the identifier of the operation request sender and the type of the operation performed to the subscribed resource to the subscriber and/or the object to which the notification is to be sent. Under a situation that the content of the notification is the type of the operation performed to the subscribed resource, the CSE sends the notification message carrying the type of the operation performed to the subscribed resource to the subscriber and/or the object to which the notification is to be sent. Regardless of what the content of the notification indicated by the resource subscription request is, the CSE sends the notification message carrying the identifier of the operation request sender to the subscriber and/or the object to which the notification is to be sent. Regardless of what the content of the notification indicated by the resource subscription request is, the CSE sends the notification message carrying the identifier of the operation request sender and the type of the operation performed to the subscribed resource to the subscriber and/or the object to which the notification is to be sent. Regardless of what the content of the notification indicated by the resource subscription request is, the CSE sends the notification message carrying the type of the operation performed to the subscribed resource to the subscriber and/or the object to which the notification is to be sent.

In an embodiment, a resource subscription processing method is further provided. FIG. 3 illustrates a flowchart of a resource subscription processing method 2 according to the embodiment of the present document. As illustrated in FIG. 3, the process includes the following steps:

In step S302, an Application Entity (AE) sends a resource subscription request to a Common Sever Entity (CSE), the resource subscription request carrying content of a notification, the notification is for indicating an operation to a subscribed resource. It needs to be stated that the content of the notification may include various contents, e.g., include at least one of the following: an identifier of an operator which performs the operation to the subscribed resource, and a type of the operation performed to the subscribed resource.

In step S304, the AE receives a notification message fed back by the CSE according to the content of the notification.

Through the above-mentioned steps, for the AE, after the AE sends the resource subscription request carrying the content of the notification about the operation performed to the subscribed resource, the AE receives the notification message fed back by the CSE. As compared to the related art in which the AE does not know the operation performed to the subscribed resource, by adopting the above-mentioned method, the AE can effectively monitor the operation performed to the subscribed resource, and not only can the subscribed resource be effectively prevented from being destroyed, but also can the subscribed resource be more efficient.

Correspondingly, the received notification messages fed back by the CSE may also be different according to different contents of notification carried in the resource subscription request sent to the CSE. For example, the AE receives the notification message fed back by the CSE according to the content of the notification may include at least one of the following: the AE receives the notification message fed back by the CSE which carries an identifier of an operation request sender; the AE receives the notification message fed back by the CSE which carries the identifier of the operation request sender and the type of the operation performed to the subscribed resource; and the AE receives the notification message fed back by the CSE which carries the type of the operation performed to the subscribed resource.

In an exemplary embodiment, after the AE receives the notification message fed back by the CSE according to the content of the notification, an operation record of operations performed to the subscribed resource may also be updated according to the notification message. By adopting this processing, the AE is enabled to save a latest state of the subscribed resource.

In an embodiment, a resource subscription processing device is further provided. The device is arranged to implement the above-mentioned embodiment and exemplary implementation mode, which have already been described and thus are not repetitively described herein. As used below, the term "module" may be a combination of software and/or hardware capable of realizing predetermined functions. Although the device described in the embodiment below may be implemented by means of software, the implementation by means of hardware or combinations of software and hardware may also be possible and be conceived.

Figure 4:
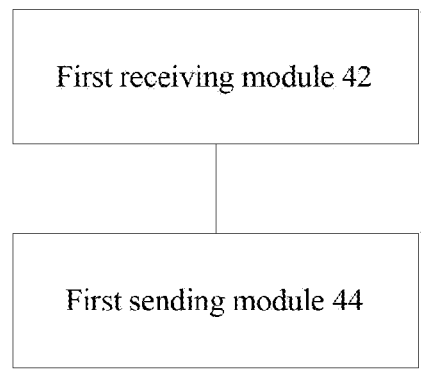
FIG. 4 illustrates a structural diagram of a first resource subscription processing device according to an embodiment of the present document.

FIG. 4 illustrates a structural diagram of a resource subscription processing device 1 according to an embodiment of the present document. As illustrated in FIG. 4, the device is configured as a Common Server Entity (CSE) and includes a first receiving module 42 and a first sending module 44. The device will be described below.

The first receiving module 42 is arranged to receive a resource subscription request sent by a subscriber, herein the resource subscription request carries content of a notification and/or an object to which the notification is to be sent, the notification is for indicating an operation to a subscribed resource; and the first sending module 44 is connected to the first receiving module 42 and is arranged to send a notification message to the subscriber and/or the object to which the notification is to be sent according to the content of the notification.

Figure 5:
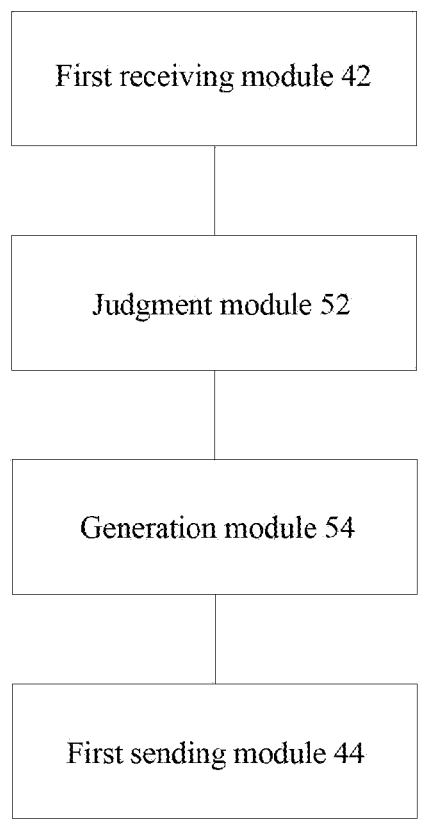
FIG. 5 illustrates an exemplary structural diagram of a first resource subscription processing device according to an embodiment of the present document.

FIG. 5 illustrates an exemplary structural diagram of the resource subscription processing device 1 according to an embodiment of the present document. As illustrated in FIG. 5, the device further includes a judgment module 52 and a generation module 54 in addition to all structures illustrated in FIG. 4. The device will be described below.

The judgment module 52 is connected to the first receiving module 42 and is arranged to, under a situation that the resource subscription request carries indication information configured for indicating that the notification message is sent only when a predetermined operation is performed to the subscribed resource, judge whether the operation performed to the subscribed resource is the predetermined operation; and the generation module 54 is connected to the judgment module 52 and the first sending module 44, and is arranged to, under a situation that a judgment result of the judgment module 52 is yes, generate the notification message according to the content of the notification.

Figure 6:
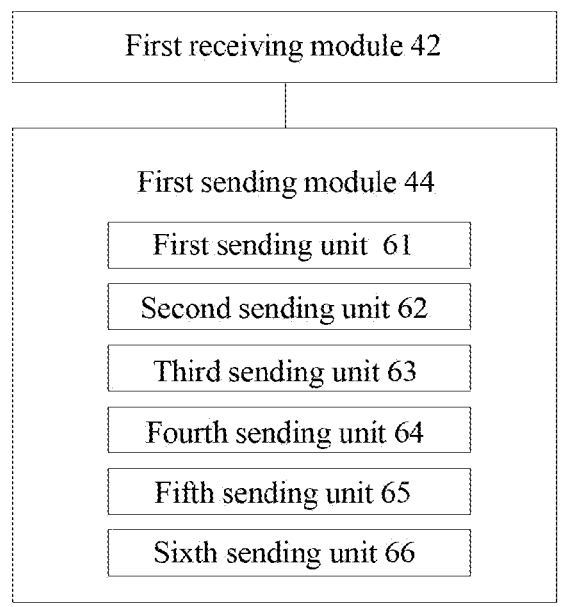
FIG. 6 illustrates an exemplary structural diagram of a first sending module 44 in the first resource subscription processing device according to an embodiment of the present document.

FIG. 6 illustrates an exemplary structural diagram of the first sending module 44 in the resource subscription processing device 1 according to an embodiment of the present document. As illustrated in FIG. 6, the first sending module 44 includes at least one of the following: a first sending unit 61, a second sending unit 62, a third sending unit 63, a fourth sending unit 64, a fifth sending unit 65 and a sixth sending unit 66. The first sending module 44 will be described below.

The first sending unit 61 is arranged to, under a situation that the content of the notification is an identifier of an operator which performs the operation to the subscribed resource, send the notification message carrying an identifier of an operation request sender to the subscriber and/or the object to which the notification is to be sent. The second sending unit 62 is arranged to, under a situation that the content of the notification is the identifier of the operator which performs the operation to the subscribed resource and a type of the operation performed to the subscribed resource, send the notification message carrying the identifier of the operation request sender and the type of the operation performed to the subscribed resource to the subscriber and/or the object to which the notification is to be sent. The third sensing unit 63 is arranged to, under a situation that the content of the notification is the type of the operation performed to the subscribed resource, send the notification message carrying the type of the operation performed to the subscribed resource to the subscriber and/or the object to which the notification is to be sent. The fourth sending unit 64 is arranged to, regardless of what the content of the notification indicated by the resource subscription request is, send the notification message carrying the identifier of the operation request sender to the subscriber and/or the object to which the notification is to be sent. The fifth sending unit 65 is arranged to, regardless of that the content of the notification indicated by the resource subscription request is, send the notification message carrying the identifier of the operation request sender and the type of the operation performed to the subscribed resource to the subscriber and/or the object to which the notification is to be sent. And the sixth sending unit 66 is arranged to, regardless of what the content of the notification indicated by the resource subscription request is, send the notification message carrying the type of the operation performed to the subscribed resource to the subscriber and/or the object to which the notification is to be sent.

Figure 7:
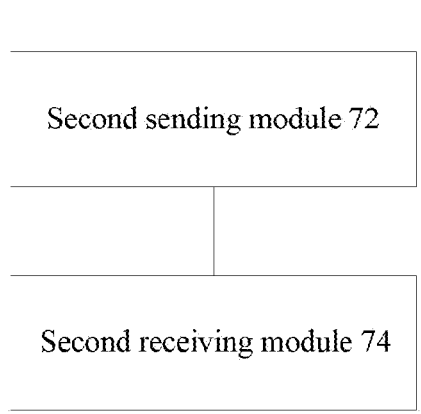
FIG. 7 illustrates a structural diagram of a second resource subscription processing device according to an embodiment of the present document.

FIG. 7 illustrates a structural diagram of a resource subscription processing device 2 according to an embodiment of the present document. The device is configured as an Application Entity (AE) and includes a second sending module 72 and a second receiving module 74. The device will be described below.

The second sending module 72 is arranged to send a resource subscription request to a Common Sever Entity (CSE), herein the resource subscription request carries content of a notification, the notification is for indicating an operation to a subscribed resource; and the second receiving module 74 is connected to the second sending module 72 and is arranged to receive a notification message fed back by the CSE according to the content of the notification.

Figure 8:
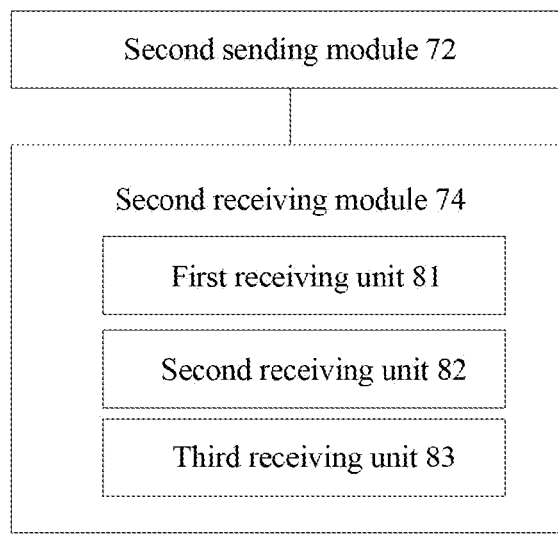
FIG. 8 illustrates an exemplary structural diagram of a second receiving module 74 in the second resource subscription processing device according to an embodiment of the present document.

FIG. 8 illustrates an exemplary structural diagram of the second receiving module 74 in the resource subscription processing device 2 according to an embodiment of the present document. As illustrated in FIG. 8, the second receiving module 74 includes at least one of the following: a first receiving unit 81, a second receiving unit 82 and a third receiving unit 83. The second receiving module 74 will be described below.

The first receiving unit 81 is arranged to receive the notification message fed back by the CSE which carries an identifier of an operation request sender; the second receiving unit 82 is arranged to receive the notification message fed back by the CSE which carries the identifier of the operation request sender and a type of the operation performed to the subscribed resource; and the third receiving unit 83 is arranged to receive the notification message fed back by the CSE which carries the type of the operation performed to the subscribed resource.

Figure 9:
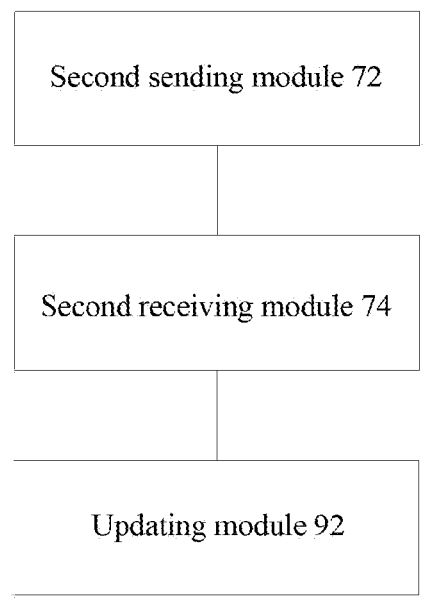
FIG. 9 illustrates an exemplary structural diagram of a second resource subscription processing device according to an embodiment of the present document.

FIG. 9 illustrates an exemplary structural diagram of the resource subscription processing device 2 according to an embodiment of the present document. As illustrated in FIG. 9, the device further includes an updating module 92 in addition to all structures illustrated in FIG. 7. The updating module 92 will be described below.

The updating module 92 is connected to the second receiving module 74 and is arranged to update an operation record of operations performed to the subscribed resource according to the notification message.

Regarding the above-mentioned problem of the related art, in addition to that the subscriber acquires the updated attribute or sub-resource through notification during resource updating, the subscriber may also need to know who modifies the resource, and as such, may find a source which viciously modifies the resource or the subscriber can statistically collect data such as who modifies the resource and how many times the resource is modified. In an embodiment of the present document, a method for a subscriber to process a resource is provided. By configuring a subscribed resource, the subscriber can track and make statistics of operators of the resource.

The method includes the following steps:

In step S1, a subscriber sends a subscribed resource creation request to a CSE1, herein the subscribed resource creation request may contain: (1) a notification sending address, i.e., a destination address to which a generated notification message needs to be sent; (2) an address of a subscribed resource, i.e., an address of a target resource which needs to be tracked; and (3) a notification message content, which indicates information that needs to be contained in the notification message and may be arranged to indicate that an identifier of an operator needs to be contained, or indicate that the identifier of the operator and a type of the operation need to be contained, or indicate that the type of the operation needs to be contained.

In step S2, after the CSE1 verifies that a request sender has an authority of creating a subscribed resource for a resource that is subscribed, the CES1 creates a sub-resource under the resource that is subscribed, i.e., sub-resource: subscribed resource, creates attributes "notification sending address" and "notification message content" for the subscribed resource, and configures values thereof to be values of corresponding attributes in the subscribed resource creation request.

In step S3, an AE or CSE (but not including the CSE1) sends an operation request to the CSE 1, herein the operation request contains: (1) from: an identifier of an operation request sender; (2) to: an address of a target resource which needs to be operated; and (3) a type of the operation, set to be create, or read, or update or delete.

In step S4, if the address of the target resource which needs to be operated is the subscribed resource, the CSE1 generates a notification message according to the information of "notification message content":

(1) if the "notification message content" indicates that the identifier of the operator should be contained, the identifier of the operation request sender is used as the identifier of the operator and contained in the notification message;

(2) if the "notification message content" indicates that the identifier of the operator and the type of the operation should be contained, the identifier of the operation request sender used as the identifier of the operator and the type of the operation are contained in the notification message;

(3) if the "notification message content" indicates that the type of the operation should be contained, the type of the operation is contained in the notification message;

(4) under any situation (i.e., regardless of what is indicated by the "notification message content"), the identifier of the operator is contained in the notification message;

(5) under any situation, the type of the operation is contained in the notification message; and (6) under any situation, the identifier of the operator and the type of the operation are contained in the notification message.

In step S5, the CSE1 sends the notification message to the "notification sending address".

Exemplary embodiments of the present document will be described below.

Exemplary Embodiment 1:

In step S1, an application entity AE1 sends a resource creation request to a CSE1, the resource creation request containing:

1) resource name: "myApplication";
2) resource type: "Application";
3) create to: \\CSEBase; and
4) content: containing an attribute(s), which needs to be created, for the resource.

In step S2, after the CSE1 receives the resource creation request of the AE1, the CSE1 verifies whether the AE1 has an authority of creating the resource, if yes, the resource is created under a resource directory \\CSEBase of the CSE1, the resource name is set to be "myApplication" and the resource type is set be "Application". Meanwhile, the attribute(s) of the resource "myApplication" is created according to the content in the request message.

Note: the above-mentioned process is a process of creating a resource in the related art.

In step S3, the AE1 sends a resource creation request to the CSE1, the resource creation request containing:

1) resource name: "mySubscription";
2) resource type: "Subscription";
3) create to: \\CSEBase\myApplication, which is an address of a subscribed resource; and
4) content: including names and values of the following parameters:
   i) notification sending address: address of AE1; and
   ii) notification message content: "identifier of operator".

In step S4, after the CSE1 verifies that the AE1 has an authority of creating a subscribed resource for a resource that is subscribed, the CSE1 creates a sub-resource under the resource that is subscribed, i.e., sub-resource: subscribed resource, creates attributes "notification sending address" and "notification message content" for the subscribed resource, and sets the values of the attributes to be values of corresponding attributes in the subscribed resource creation request.

In step S5, an AE2 sends an operation request to the CSE1, the operation request containing:

1) from: identifier of AE2;
2) to: \\CSEBase\myApplication; and
3) type of operation: read.

In step S6, when the CSE1 detects that what is updated is the resource that is subscribed, the CSE1 generates a notification message according to the information of "notification message content"; and when the CSE1 detects that "notification message content" indicates an identifier of an operator, the identifier of AE2 is used as the identifier of the operator and contained in the notification message.

In step S7, the CSE1 sends the notification message to "notification sending address".

In step S8, the AE1 records the identifier of the operator, if there is a record of the identifier of the AE2 in a current database, operation times behind the identifier of the AE2 is added by 1, and if there is no record of the identifier of the AE2 in the current database, a record of the identifier of the AE2 is created and the operation times is set to be 1.

Exemplary Embodiment 2:

In step S1, an application entity AE1 sends a resource creation request to a CSE1, the resource creation request containing:

1) resource name: "myApplication";
2) resource type: "Application";
3) create to: \\CSEBase; and
4) content: containing an attribute(s), which needs to be created, for the resource.

In step S2, after the CSE1 receives the resource creation request of the AE1, the CSE1 verifies whether the AE1 has an authority of creating the resource, if yes, the resource is created under a resource directory \\CSEBase of the CSE1, the resource name is set to be "myApplication" and the resource type is "Application". Meanwhile, the attribute(s) of the resource "myApplication" is created according to the content in the request message.

Note: the above-mentioned process is a process of creating a resource in the prior art.

In step S3, the AE1 sends a resource creation request to the CSE1, the resource creation request containing:

1) resource name: "mySubscription";
2) resource type: "Subscription";
3) create to: \\CSEBase\myApplication, which is an address of a subscribed resource; and
4) content: including names and values of the following parameters:
   i) notification sending address: address of AE1; and
   ii) notification message content: "identifier of operator and type of operation".

In step S4, after the CSE1 verifies that the AE1 has an authority of creating a subscribed resource for a resource that is subscribed, the CSE1 creates a sub-resource under the resource that is subscribed, i.e., sub-resource: subscribed resource, creates attributes "notification sending address" and "notification message content" for the subscribed resource, and configures values of the attributes to be values of corresponding attributes in the subscribed resource creation request.

Then the resource "myApplication" is referred to as a resource that is subscribed.

In step S5, a CSE2 sends an operation request to the CSE1, the operation request containing:

1) from: identifier of CSE2;
2) to: \\CSEBase\myApplication; and
3) type of operation: update.

In step S6, when the CSE1 detects that what is updated is the resource that is subscribed, the CSE1 generates a notification message according to the information of "notification message content"; and when the CSE1 detects that the "notification message content" indicates an identifier of an operator and a type of the operation, the identifier of CSE2 used as the identifier of the operator and the type of the operation "update" are contained in the notification message.

In step S7, the CSE1 sends the notification message to the "notification sending address".

In step S8, the AE1 records the identifier of the operator, if there is a record of the identifier of the CSE2 in a current database, operation times behind the identifier of the CSE 2 is added by 1, and if there is no record of the identifier of the CSE2 in the current database, a record of the identifier of the CSE2 is created and the operation times is set to be 1.

Exemplary Embodiment 3:

In step S1, an application entity AE1 sends a resource creation request to a CSE1, the resource creation request containing:
1) resource name: "myApplication";
2) resource type: "Application";
3) create to: \\CSEBase; and
4) content: containing an attribute(s), which needs to be created, of the resource.

In step S2, after the CSE1 receives the resource creation request of the AE1, the CSE1 verifies whether the AE1 has an authority of creating the resource, if yes, the resource is created under a resource directory \\CSEBase of the CSE1, the resource name is set to be "myApplication" and the resource type is "Application". Meanwhile, the attribute(s) of the resource "myApplication" is created according to the content in the request message.

Note: the above-mentioned process is a process of creating a resource in the prior art.

In step S3, the AE1 sends a resource creation request to the CSE1, the resource creation request containing:
1) resource name: "mySubscription";
2) resource type: "Subscription";
3) create to: \\CSEBase\myApplication, which is an address of a subscribed resource; and
4) content: including names and values of the following parameters:
  i) notification sending address: address of AE1; and
  ii) notification message content: "type of operation".

In step S4, after the CSE1 verifies that the AE1 has an authority of creating a subscribed resource for a resource that is subscribed, the CSE1 creates a sub-resource under the resource that is subscribed, i.e., sub-resource: subscribed resource, creates attributes "notification sending address" and "notification message content" for the subscribed resource, and configures values of the attributes to be values of corresponding attributes in the subscribed resource creation request.

In step S5, an AE2 sends an operation request to the CSE1, the operation request containing:
1) from: identifier of AE2;
2) to: \\CSEBase\myApplication; and
3) type of operation: create.

In step S6, when the CSE1 detects that what is updated is the resource that is subscribed, the CSE1 generates a notification message according to the information of "notification message content"; and when the CSE1 detects that the "notification message content" indicates a type of an operation, the type of the operation "create" is contained in the notification message.

In step S7, the CSE1 sends the notification message to the "notification sending address".

In step S8, the AE1 records the type of the operation, if there is a record of "create" in a current database, operation times behind the "create" is added by 1, and if there is no record of "create" in the current database, a record of "create" is created and the operation times is set to be 1.

Exemplary Embodiment 4:

In step S1, an application entity AE1 sends a resource creation request to a CSE1, the resource creation request containing:
1) resource name: "myApplication";
2) resource type: "Application";
3) create to: \\CSEBase; and
4) content: containing an attribute(s), which needs to be created, for the resource.

In step S2, after the CSE1 receives the resource creation request of the AE1, the CSE1 verifies whether the AE1 has an authority of creating the resource, if yes, the resource is created under a resource directory \\CSEBase of the CSE1, the resource name is set to be "myApplication" and the resource type is "Application". Meanwhile, the attribute(s) of the resource "myApplication" is created according to the content in the request message.

Note: the above-mentioned process is a process of creating a resource in the prior art.

In step S3, the AE1 sends a resource creation request to the CSE1, the resource creation request containing:
1) resource name: "mySubscription";
2) resource type: "Subscription";
3) create to: \\CSEBase\myApplication, which is an address of a subscribed resource; and
4) content: including names and values of the following parameters:
  i) notification sending address: address of AE1; and
  ii) notification message content: any configuration.

In step S4, after the CSE1 verifies that the AE1 has an authority of creating a subscribed resource for a resource that is subscribed, the CSE1 creates a sub-resource under the resource that is subscribed, i.e., sub-resource: subscribed resource, creates attributes "notification sending address" and "notification message content" for the subscribed resource, and configures values of the attributes to be values of corresponding attributes in the subscribed resource creation request.

In step S5, an AE2 sends an operation request to the CSE1, the operation request containing:
1) from: identifier of AE2;
2) to: \\CSEBase\myApplication; and
3) type of operation: delete.

In step S6, when the CSE1 detects that what is updated is the resource that is subscribed, the identifier of the AE2, or the type of the operation "delete", or the identifier of AE2 and the type of the operation "delete" are contained in the notification message.

In step S7, the CSE1 sends the notification message to the "notification sending address".

Obviously, one skilled in the art should understand that all modules and all steps of the present document may be implemented by using general-purpose computing devices, they may be integrated in a single computing device or distributed on a network consisting of a plurality of computing devices, optionally they may be implemented by using program codes executable by computing devices, thus they may be stored in memory devices and executed by computing devices, and under certain circumstances, the illustrated or described steps may be executed according to a sequence different from the sequence here, or they may be respectively manufactured into integrated circuit modules or a plurality of modules or steps thereof may be implemented by manufacturing into a single integrated circuit module. Therefore, the present document is not limited to any specific combination of hardware and software.

The embodiments described above are just exemplary embodiments of the present document and are not used for limiting the present document. For one skilled in the art, the present document may have various modifications and variations. Any modification, equivalent replacement, improvement and the like made within the spirit and principle of the present document shall be included in the scope of the present document.

INDUSTRIAL APPLICABILITY

As described above, through the above-mentioned embodiments and exemplary implementation modes, the AE can effectively monitor the operation performed to the subscribed resource, and not only can the subscribed resource be effectively prevented from being destroyed, but also can the subscribed resource be more efficient.

I claim:

1. A resource subscription processing method, comprising:
   a Common Server Entity (CSE) receiving a resource subscription request sent by a subscriber, wherein the resource subscription request carries content of a notification and/or an object to which the notification is to be sent, the notification is for indicating an operation to a subscribed resource; and
   the CSE sending a notification message to the subscriber and/or the object to which the notification is to be sent according to the content of the notification; wherein the content of the notification comprises at least one of the following:
   an identifier of an operator which performs the operation to the subscribed resource, and a type of the operation performed to the subscribed resource; wherein the CSE sending the notification message to the subscriber and/or the object to which the notification is to be sent according to the content of the notification comprises at least one of the following:
   under a situation that the content of the notification is the identifier of the operator which performs the operation to the subscribed resource, the CSE sending the notification message carrying an identifier of an operation request sender to the subscriber and/or the object to which the notification is to be sent;
   under a situation that the content of the notification is the identifier of the operator which performs the operation to the subscribed resource and the type of the operation performed to the subscribed resource, the CSE sending the notification message carrying the identifier of the operation request sender and the type of the operation performed to the subscribed resource to the subscriber and/or the object to which the notification is to be sent;
   under a situation that the content of the notification is the type of the operation performed to the subscribed resource, the CSE sending the notification message carrying the type of the operation performed to the subscribed resource to the subscriber and/or the object to which the notification is to be sent;
   regardless of what the content of the notification indicated by the resource subscription request is, the CSE sending the notification message carrying the identifier of the operation request sender to the subscriber and/or the object to which the notification is to be sent;
   regardless of what the content of the notification indicated by the resource subscription request is, the CSE sending the notification message carrying the identifier of the operation request sender and the type of the operation performed to the subscribed resource to the subscriber and/or the object to which the notification is to be sent; and
   regardless of what of the content of the notification indicated by the resource subscription request is, the CSE sending the notification message carrying the type of the operation performed to the subscribed resource to the subscriber and/or the object to which the notification is to be sent.

2. The method according to claim 1, wherein, before the CSE sends the notification message to the subscriber and/or the object to which the notification is to be sent according to the content of the notification, the method further comprises:
   under a situation that the resource subscription request carries indication information for indicating that the notification message is sent only when a predetermined operation is performed to the subscribed resource, judging whether the operation performed to the subscribed resource is the predetermined operation; and
   under a situation that a judgment result is yes, generating the notification message according to the content of the notification.

3. A resource subscription processing method, comprising:
   an Application Entity (AE) sending a resource subscription request to a Common Sever Entity (CSE), wherein the resource subscription request carries content of a notification, the notification is for indicating an operation to a subscribed resource; and
   the AE receiving a notification message fed back by the CSE according to the content of the notification; wherein the content of the notification comprises at least one of the following:
   an identifier of an operator which performs the operation to the subscribed resource, and a type of the operation performed to the subscribed resource; wherein the AE receiving the notification message fed back by the CSE according to the content of the notification comprises at least one of the following:
   the AE receiving the notification message fed back by the CSE which carries an identifier of an operation request sender;
   the AE receiving the notification message fed back by the CSE which carries the identifier of the operation request sender and the type of the operation performed to the subscribed resource; and
   the AE receiving the notification message fed back by the CSE which carries the type of the operation performed to the subscribed resource.

4. The method according to claim 3, wherein, after the AE receives the notification message fed back by the CSE according to the content of the notification, the method further comprises:
   updating an operation record of operations to the subscribed resource according to the notification message.

5. A resource subscription processing device, configured as a Common Server Entity (CSE), comprising:
   a first receiving module, arranged to receive a resource subscription request sent by a subscriber, wherein the resource subscription request carries content of a notification and/or an object to which the notification is to be sent, the notification is for indicating an operation to a subscribed resource; and
   a first sending module, arranged to send a notification message to the subscriber and/or the object to which the notification is to be sent according to the content of the notification; wherein the first sending module comprises at least one of the following:
   a first sending unit, arranged to, under a situation that the content of the notification is an identifier of an operator which performs the operation to the subscribed resource, send the notification message carrying an identifier of an operation request sender to the subscriber and/or the object to which the notification is to be sent;
   a second sending unit, arranged to, under a situation that the content of the notification is the identifier of the operator which performs the operation to the subscribed resource and a type of the operation performed to the subscribed resource, send the notification message carrying the identifier of the operation request sender and the type of the operation performed to the subscribed resource to the subscriber and/or the object to which the notification is to be sent;

a third sensing unit, arranged to, under a situation that the content of the notification is the type of the operation performed to the subscribed resource, send the notification message carrying the type of the operation performed to the subscribed resource to the subscriber and/or the object to which the notification is to be sent;

a fourth sending unit, arranged to, regardless of what the content of the notification indicated by the resource subscription request is, send the notification message carrying the identifier of the operation request sender to the subscriber and/or the object to which the notification is to be sent;

a fifth sending unit, arranged to, regardless of what the content of the notification indicated by the resource subscription request is, send the notification message carrying the identifier of the operation request sender and the type of the operation performed to the subscribed resource to the subscriber and/or the object to which the notification is to be sent; and a sixth sending unit, arranged to, regardless of what the content of the notification indicated by the resource subscription request is, send the notification message carrying the type of the operation performed to the subscribed resource to the subscriber and/or the object to which the notification is to be sent.

6. The device according to claim 5, wherein the device further comprises:

a judgment module, arranged to, under a situation that the resource subscription request carries indication information for indicating that the notification message is sent only when a predetermined operation is performed to the subscribed resource, judge whether the operation performed to the subscribed resource is the predetermined operation; and a generation module arranged to, under a situation that a judgment result is yes, generate the notification message according to the content of the notification.

7. A resource subscription processing device, configured as an Application Entity (AE), comprising:

a second sending module, arranged to send a resource subscription request to a Common Sever Entity (CSE), wherein the resource subscription request carries content of a notification, the notification is for indicating an operation to a subscribed resource; and a second receiving module, arranged to receive a notification message fed back by the CSE according to the content of the notification; wherein the second receiving module comprises at least one of the following:

a first receiving unit, arranged to receive the notification message fed back by the CSE which carries an identifier of an operation request sender;

a second receiving unit, arranged to receive the notification message fed back by the CSE which carries the identifier of the operation request sender and a type of the operation performed to the subscribed resource; and a third receiving unit, arranged to receive the notification message fed back by the CSE which carries the type of the operation performed to the subscribed resource.

8. The device according to claim 7, wherein the device further comprises:

an updating module, arranged to update an operation record of operations to the subscribed resource according to the notification message.

* * * * *